United States Patent
Hiraoka et al.

(10) Patent No.: US 8,377,495 B2
(45) Date of Patent: Feb. 19, 2013

(54) WATER-IN-OIL TYPE FAT OR OIL COMPOSITION AND METHOD FOR PRODUCING THE SAME

(75) Inventors: Minako Hiraoka, Tokyo (JP); Kazuhisa Mochizuki, Tokyo (JP); Takashi Yamaguchi, Tokyo (JP); Aki Teraminami, Tokyo (JP); Hiroshi Ito, Tokyo (JP)

(73) Assignee: J-Oil Mills, Inc., Tokyo (JP)

( * ) Notice: Subject to any disclaimer, the term of this patent is extended or adjusted under 35 U.S.C. 154(b) by 0 days.

(21) Appl. No.: 13/254,560

(22) PCT Filed: Jul. 21, 2011

(86) PCT No.: PCT/JP2011/066543
§ 371 (c)(1),
(2), (4) Date: Sep. 2, 2011

(87) PCT Pub. No.: WO2012/117580
PCT Pub. Date: Sep. 7, 2012

(65) Prior Publication Data
US 2012/0219692 A1 Aug. 30, 2012

(30) Foreign Application Priority Data
Feb. 28, 2011 (JP) .................................. 2011-041590

(51) Int. Cl.
*A23D 7/00* (2006.01)

(52) U.S. Cl. ......... 426/603; 426/602; 426/604; 426/231
(58) Field of Classification Search .......... 426/602–604, 426/231
See application file for complete search history.

(56) References Cited

U.S. PATENT DOCUMENTS

| | | | | | |
|---|---|---|---|---|---|
| 3,946,122 | A | * | 3/1976 | Scharp | 426/604 |
| 4,103,037 | A | * | 7/1978 | Bodor et al. | 426/575 |
| 6,060,107 | A | * | 5/2000 | Reddy | 426/603 |
| 6,190,721 | B1 | * | 2/2001 | Kimura et al. | 426/604 |

OTHER PUBLICATIONS

Codex Standard 256-2007—"Standard for Fat Spreads and Blended Spreads", edited and last modified in 2009 by the Codex Committee on Fats and Oils (CCFO) of the Food and Agriculture Organization (FAO) of the United Nations.

* cited by examiner

*Primary Examiner* — Carolyn Paden

(57) ABSTRACT

An object of the present invention is to provide a water-in-oil type fat or oil composition which exhibits satisfactory demulsification in the mouth regardless of a low salt content, and which makes a consumer feel moderate saltiness, and a method for producing the same. Disclosed is a water-in-oil type fat or oil composition containing 0.4% by weight or more and less than 1.0% by weight of a salt, wherein the time required to reach 50% of an equilibrium value is within 50 seconds in an increase in conductivity at 35° C.

5 Claims, 2 Drawing Sheets

WATER-IN-OIL TYPE FAT OR OIL COMPOSITION AND METHOD FOR PRODUCING THE SAME

TECHNICAL FIELD

The present invention relates to a water-in-oil type fat or oil composition which exhibits satisfactory demulsification in the mouth regardless of a low salt content and which makes a consumer feel moderate saltiness, and a method for producing the same.

BACKGROUND ART

According to the 2010 edition of Dietary Reference Intakes for Japanese, the target amount of salt intake was reduced. Thus, it was set to less than 9 g in adult males and to less than 7.5 g in adult females. According to the National Health and Nutrition Examination Survey carried out in 2009, the daily salt intake of Japanese was 11.6 g in males and 9.9 g in females. The intake was reduced as compared with that in the previous year, but did not reach the target amount at present. Accordingly, reduced salt type food is required widely over the entire dietary life so as to reduce the salt intake.

Margarines marketed for home use are divided roughly into margarines for confectionery and bread and table margarines. Margarines for confectionery and bread include products containing no salt, while table margarines usually contain 1.0 to 1.8% by weight of a salt. The amount of a salt is similar to that of a commercially available butter. Herein, it is not easy for consumers to feel saltiness in a water-in-oil type of emulsified fat or oil composition such as margarines, as compared with other foods having a similar salt concentration. Since reduced salt type margarines having a salt concentration of about 0.3 to 1.0% by weight exhibits slight saltiness, it was a problem that sufficient taste is not obtained.

In order to solve this problem, a method for producing a plastic fat or oil composition in which an average cooling rate is 5° C./second or more is disclosed (Japanese Patent No. 4,588,007). Although margarines for kneading having satisfactory plasticity can be produced by this production method, sufficient saltiness as shown in the below-mentioned Examples cannot be exhibited.

Also, there is disclosed a spread which really melts in the mouth and spreads satisfactory flavor by using a phospholipid and an emulsifier in combination (Japanese Patent No. 3,459,655). Although melt-in-the-mouth of a low fat spread can be improved, sufficient saltiness can not be obtained in a spread having a salt concentration of less than 1.0% by weight.

Accordingly, it is required to develop a water-in-oil type fat or oil composition such as margarines, which has a low salt content and exhibits sufficient saltiness.

Patent document 1: Japanese Patent No. 4,588,007
Patent document 2: Japanese Patent No. 3,459,655

SUMMARY OF INVENTION

Solution to Problem

An object of the present invention is to provide a water-in-oil type fat or oil composition which exhibits satisfactory demulsification in the mouth regardless of a low salt content and which makes a consumer feel moderate saltiness, and a method for producing the same.

The present inventors has intensively studied so as to achieve the above object and found that a water-in-oil type fat or oil composition, which satisfies a certain condition in a change in conductivity at 35° C., exhibits satisfactory demulsification in the mouth regardless of a low salt content and makes a consumer feel moderate saltiness, and thus the present invention has been completed.

The present invention provides a water-in-oil type fat or oil composition containing 0.4% by weight or more and less than 1.0% by weight of a salt, wherein the time required to reach 50% of an equilibrium value is within 50 seconds in an increase in conductivity at 35° C. More preferably, the content of the salt is 0.4% by weight or more and 0.9% by weight or less.

Also, the above time required to reach 50% of an equilibrium value is preferably within 40 seconds, more preferably within 35 seconds, and still more preferably within 27 seconds.

Furthermore, the content of an oil phase in the water-in-oil type fat or oil composition is preferably 61% by weight or more.

Furthermore, the water-in-oil type fat or oil composition preferably contains a glycerin fatty acid ester.

The water-in-oil type composition is preferably produced using a continuous type cooling and kneading device including at least each one or more of a scraping type cooling unit (A unit) and a kneading unit (B unit), wherein
(a) an average cooling rate in an initial A unit is 1.2° C./second or more and less than 2.5° C./second, and
(b) an emulsion temperature of a final B unit outlet is at least 1.5° C. higher than an emulsion temperature of an outlet of the A unit immediately before the final B unit.

Also, the present invention provides a method for producing a water-in-oil type fat or oil composition containing 0.4% by weight or more and less than 1.0% by weight of a salt, wherein the time required to reach 50% of an equilibrium value is within 50 seconds in an increase in conductivity at 35° C., the method including cooling and kneading a raw material for a water-in-oil type fat or oil composition containing 0.4% by weight or more and less than 1.0% by weight of a salt, using a continuous type cooling and kneading device comprising at least each one or more of a scraping type cooling unit (A unit) and a kneading unit (B unit), wherein
(a) an average cooling rate in an initial A unit is 1.2° C./second or more and less than 2.5° C./second, and
(b) an emulsion temperature of a final B unit outlet is at least 1.5° C. higher than an emulsion temperature of an outlet of the A unit immediately before the final B unit.

In the production method, the time required to reach 50% of an equilibrium value is preferably within 40 seconds, more preferably within 35 seconds, and still more preferably within 27 seconds.

In the production method, the content of a salt in the above water-in-oil type fat or oil composition is preferably 0.4% by weight or more and less than 1.0% by weight, and more preferably 0.4% by weight or more and 0.9% by weight or less.

In the production method, the content of an oil phase in the above water-in-oil type fat or oil composition is preferably 61% by weight or more.

In the production method, the water-in-oil type fat or oil composition preferably contains a glycerin fatty acid ester.

Also, the present invention provides a method for enhancing the development of a taste component in an aqueous phase of a water-in-oil type fat or oil composition, the method including cooling and kneading a raw material for a water-in-oil type fat or oil composition containing a taste component, using a continuous type cooling and kneading device comprising at least each one or more of a scraping type cooling unit (A unit) and a kneading unit (B unit), wherein (a) an average cooling rate in an initial A unit is 1.2° C./second or more and less than 2.5° C./second, and
(b) an emulsion temperature of a final B unit outlet is at least 1.5° C. higher than an emulsion temperature of an outlet of the A unit immediately before the final B unit.

Advantageous Effects of Invention

According to the present invention, it is possible to obtain a water-in-oil type fat or oil composition which exhibits satisfactory demulsification in the mouth regardless of a low salt content and which makes a consumer sense moderate saltiness.

DESCRIPTION OF EMBODIMENTS

Figure 1:
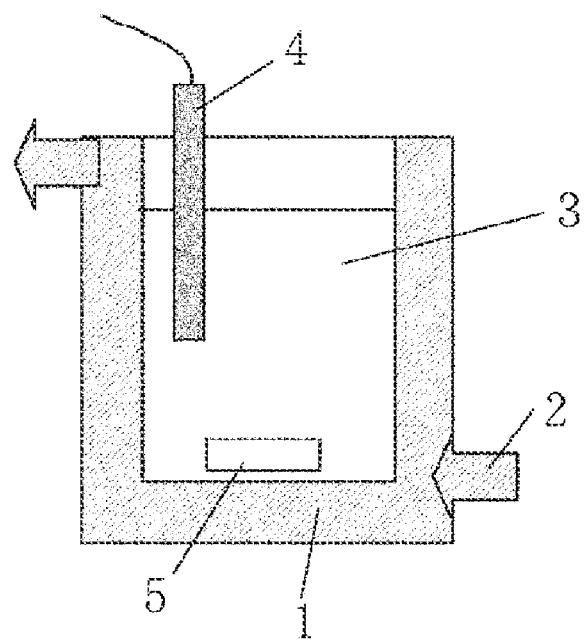
FIG. 1 is a schematic view of a device used for the measurement of conductivity.

Examples of the fat or oil used in the present invention include various vegetable and animal fats or oils, such as palm oil, palm kernel oil, coconut oil, corn oil, cotton oil, soybean oil, rapeseed oil, rice oil, sunflower oil, safflower oil, olive oil, peanut oil, kapok oil, sesame oil, evening primrose oil, cacao butter, shea butter, sal butter, beef tallow, milk fat, lard, fish oil and train oil, and processed fats or oils obtained by subjecting the above fats or oils to one or more treatments selected from hydrogenation, fractionation and transesterification. One or more fats or oils selected from them can be used in the present invention.

In case the content of an oil phase in the water-in-oil type fat or oil composition of the present invention is 61% by weight or more, an effect of enhancing the development of a taste component in an aqueous phase becomes higher.

The water-in-oil type fat or oil composition of the present invention can contain an emulsifier. Examples of the emulsifier include synthetic emulsifiers such as, for example, a glycerin fatty acid ester, a glycerin acetic acid fatty acid ester, a glycerin lactic acid fatty acid ester, a glycerin succinic acid fatty acid ester, a glycerin tartaric acid fatty acid ester, a glycerin citric acid fatty acid ester, a glycerin diacetyltartaric acid fatty acid ester, a sorbitan fatty acid ester, a sucrose fatty acid ester, a sucrose acetic acid isobutyric acid ester, a polyglycerin fatty acid ester, a polyglycerin condensated recinoleic acid ester, a propylene glycol fatty acid ester, calcium stearoyl lactate, sodium stearoyl lactate, a polyoxyethylene sorbitan monostearate, and a polyoxyethylene sorbitan monoglyceride, and natural emulsifiers such as, for example, soybean lecithin, egg-yolk lecithin, soybean lysolecithin, egg-yolk lysolecithin, an enzyme treated egg-yolk, saponin, phytosterols, and a milk fat globule film. A glycerin fatty acid ester is preferred. There is no particular limitation on the content of the emulsifier, and the content is preferably 0.1 to 10% by weight, and more preferably 0.1 to 5% by weight in the water-in-oil type fat or oil composition of the present invention.

Also, other components can be contained, if necessary. Other components include, for example, food materials and food additives such as thickening stabilizers, acidulants such as acetic acid, lactic acid, and gluconic acid, coloring agents such as β-carotene, caramel, and a red yeast pigment, antioxidants such as tocopherol, and a tea extract, vegetable proteins such as a wheat protein and a soybean protein, egg and various processed egg products, flavoring agents, milk products, seasoning agents, pH adjusters, food preservatives, life-improving agents, fruits, fruit juices, coffee, nut pastes, spices, cacao mass, cocoa powder, grain, beans, vegetables, meat, and sea food.

The water-in-oil type of emulsified fat or oil composition such as margarine of the present invention is produced using a continuous type cooling and kneading device.

Devices usually used by those skilled in the art can be used as a continuous type cooling and kneading device used in the production method of the present invention. Specifically, the device comprises at least each one or more of a scraping type cooling unit which cools a fat or oil composition through a cooling medium (A unit) and a kneading unit (B unit). The continuous type cooling and kneading device includes a votator, a combinator, a perfector, a chemtator and the like.

A plurality of the A units can be arranged in series. Also, the B unit can be arranged in a suitable position. Moreover, it is possible to arrange a holding tube, an intermediate crystallizing tube and the like, if necessary.

For example, examples of the arrangement order for connecting the units in series include AAB, AAAB, ABAB and the like.

In the production method of the present invention, the temperature of a fat or oil composition at an A unit inlet is preferably 40° C. or more and 60° C. or less. A low temperature is not preferred because crystallization of a fat or oil may occur before cooling in the A unit.

The average cooling rate when passing through an initial A unit is 1.2° C./second or more and less than 2.5° C./second. The rate is preferably 1.5° C./second or more and less than 2.5° C./second, and more preferably 1.7° C./second or more and 2.4° C./second or less. When the average cooling rate is too low, properties of a water-in-oil type fat or oil composition are not satisfactory, in contrast, when the average cooling rate is too high, satisfactory saltiness can not be obtained.

Next, the cooled fat or oil composition can be kneaded in a B unit to obtain a water-in-oil type fat or oil composition. Subsequently, a further cooling step may be added, for example, by passing through a further A unit, but no addition of the cooling step is preferred from the viewpoint of smoothness of a product.

In the production method of the present invention, an emulsion temperature of a final B unit outlet is at least 1.5° C. higher than an emulsion temperature of an outlet of an A unit immediately before the final B unit. The former temperature is preferably 1.8° C. higher, more preferably 2.2° C. higher, and most preferably 2.5° C. higher than the latter temperature. Although there is no particular upper limit temperature, it is preferably 5.0° C. or less, and more preferably 3.5° C. or less. Satisfactory development of a taste component such as saltiness can be obtained by setting the temperature difference within a certain range. In this connection, even if a holding tube, another B unit or the like is arranged between an A unit and a final B unit, the A unit is referred to as an A unit immediately before the final B unit.

EXAMPLES

The present invention will be described in more detail by way of Examples and Comparative examples. However, the following Examples do not limit the present invention.

Fats, oils or the like used in the following are as follows:
Palm stearin (iodine value 32) (manufactured by J-Oil Mills, Inc.),
Palm kernel oil (manufactured by J-Oil Mills, Inc.),
Rapeseed oil (manufactured by J-Oil Mills, Inc.),
Lecithin (Lecithin FA, manufactured by J-Oil Mills, Inc.,) and
Glycerin fatty acid ester (Emulsy MS, manufactured by Riken Vitamin Co., Ltd.).

(Method for Measurement of Conductivity)

Conductivity at 35° C. was measured as follows. Into a jacket type glass vessel 1 as shown in FIG. 1, water 2 temperature-controlled in a constant temperature water tank (LAUDA RC6CP) was charged, deionized water 3 (200 g) in the vessel was adjusted to 35° C. Electrode 4 (RADIOMETER Analytical CDC641T) was arranged at a given position. A water-in-oil type fat or oil composition (2 g) was added to the deionized water in the vessel, and the mixture was stirred at 500 rpm with stirrer 5. Time-dependent change of conductivity was continuously measured using a conductivity meter (RADIOMETER Analytical CDM230).

(Preparation of Transesterified Oil)

To a fat containing 70 parts by weight of palm stearin and 30 parts by weight of palm kernel oil, 0.5 part by weight of sodium methylate was added as a catalyst, and random transesterification was carried out at 80° C. for 30 minutes. Purification was carried out by a conventional method to obtain a transesterified oil.

(Preparation of Water-in-Oil Type Fat or Oil Composition)

Using the formulations as shown in Table 1 and Table 2, each of oil and aqueous phases was prepared. Next, the aqueous phase was poured while stirring into the oil phase kept at about 60° C. The mixture was mixed while stirring for about 10 minutes to obtain a preliminary water-in-oil type emulsion. The preliminary emulsion was passed through an initial A unit in a continuous type cooling and kneading device (AAB) under conditions as shown in Table 1 and Table 2, and finally kneaded in a B unit to obtain a water-in-oil type fat or oil composition. The temperature of the preliminary emulsion in an initial A unit inlet was 45° C.

Figure 2:
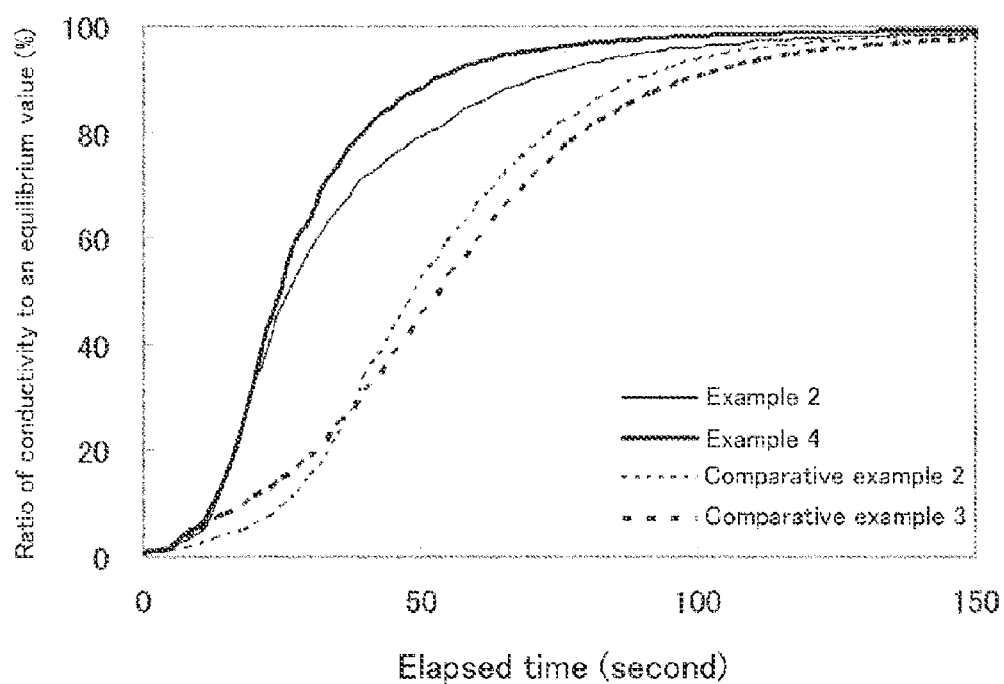
FIG. 2 is a graph showing a change in conductivity of water-in-oil type fat or oil compositions. The abscissa shows a lapse time (second) after the addition, while the ordinate shows a percentage (%) of conductivity to an equilibrium value.

Saltiness of the resulting water-in-oil type fat or oil compositions was evaluated by a sensory test by 10 expert panelists. Also, properties were evaluated. Evaluation criteria were as follows. In addition, conductivity of the fat or oil compositions was measured. The results are shown in Table 1, Table 2 and FIG. 2.

<Evaluation Criteria of Salt Sensitivity>
A: Excellent
B: Good
C: Slightly weak
D: Weak <Evaluation Criteria of Properties>
A: Good
B: Slightly good
C: Poor

TABLE 1

| | | | Example 1 | Example 2 | Example 3 | Example 4 | Example 5 | Example 6 |
|---|---|---|---|---|---|---|---|---|
| Formulation (% by weight) | Oil phase | Transesterified oil | 13.9 | 13.9 | 13.9 | 13.9 | 13.9 | 13.9 |
| | | Rapeseed oil | 55.6 | 55.6 | 55.6 | 55.6 | 55.6 | 55.6 |
| | | Lecithin | 0.2 | 0.2 | 0.2 | 0.2 | 0.2 | 0.2 |
| | | Glycerin fatty acid monoester | 0.3 | 0.3 | 0.3 | 0.3 | 0.3 | 0.3 |
| | Aqueous phase | Water | 29.1 | 28.8 | 28.6 | 28.8 | 29.1 | 29.1 |
| | | Purified salt | 0.4 | 0.7 | 0.9 | 0.7 | 0.4 | 0.4 |
| | | Skim milk powder | 0.5 | 0.5 | 0.5 | 0.5 | 0.5 | 0.5 |
| Production conditions | First A unit average cooling rate (° C./second) | | 1.5 | 1.5 | 1.5 | 2.0 | 2.2 | 2.2 |
| | (Emulsion temperature of final B unit outlet) − (Emulsion temperature of former A unit outlet) | | 2.5 | 2.5 | 2.5 | 2.5 | 3.2 | 2.5 |
| Taste, physical properties and analytical value | Saltiness | | B | A | A | A | B | B |
| | Physical properties | | B | B | B | B | B | B |
| | Conductivity upon equilibrium (mS/m/g) | | 5.2 | 10 | 14 | 10 | 5.2 | 5.2 |
| | Time required to reach 50% of conductivity upon equilibrium | | 35 | 25 | 25 | 25 | 30 | 30 |

TABLE 2

| | | | Comparative Example 1 | Comparative Example 2 | Comparative Example 3 | Example 7 |
|---|---|---|---|---|---|---|
| Formulation (% by weight) | Oil phase | Transesterified oil | 13.9 | 13.9 | 13.9 | 13.9 |
| | | Rapeseed oil | 55.6 | 55.6 | 55.6 | 55.6 |
| | | Lecithin | 0.2 | 0.2 | 0.2 | 0.2 |
| | | Glycerin fatty acid monoester | 0.3 | 0.3 | 0.3 | 0.3 |
| | Aqueous phase | Water | 29.1 | 28.8 | 28.8 | 29.1 |
| | | Purified salt | 0.4 | 0.7 | 0.7 | 0.4 |
| | | Skim milk powder | 0.5 | 0.5 | 0.5 | 0.5 |

TABLE 2-continued

|  |  | Comparative Example 1 | Comparative Example 2 | Comparative Example 3 | Example 7 |
|---|---|---|---|---|---|
| Production conditions | First A unit average cooling rate (° C./second) | 2.5 | 3.0 | 2.0 | 1.0 |
|  | (Emulsion temperature of final B unit outlet) − (Emulsion temperature of former A unit outlet) | 2.5 | 2.5 | 1.0 | 1.3 |
| Taste, physical properties and analytical value | Saltiness | D | C | D | B |
|  | Physical properties | B | B | B | D |
|  | Conductivity upon equilibrium (mS/m/g) | 5.2 | 10 | 10 | 5.2 |
|  | Time required to reach 50% of conductivity upon equilibrium | 60 | 51 | 55 | 35 |

In all of Examples 1 to 6, the time required to reach 50% of an equilibrium value was within 50 seconds in an increase in conductivity. In this case, the saltiness feeling in a sensory test was also superior. On the other hand, in Comparative examples 1 to 4, the time required to reach 50% of an equilibrium value was 50 seconds or more in an increase in conductivity. Also, the saltiness feeling in a sensory test was not satisfactory. In addition, the composition of Example 7 had an evaluation of A (satisfactory) in the saltiness feeling, but it developed roughness as days went by, and therefore, did not have satisfactory properties as a water-in-oil type fat or oil composition. As is apparent from the above results, the water-in-oil type fat or oil composition of the present invention exhibits satisfactory demulsification in the mouth regardless of a low salt content and makes a consumer sense moderate saltiness, providing that the time required to reach 50% of an equilibrium value is within 50 seconds in an increase in conductivity.

Reference Signs List

1: Jacket type glass vessel
2: Temperature-controlled water
3: Deionized water
4: Electrode
5: Stirrer

The invention claimed is:

1. A water-in-oil type fat or oil composition for margarines including margarine and fat spreads containing 0.4% by weight or more and less than 1.0% by weight of a salt, wherein the oil is at least one selected from a group consisting of vegetable and animal fats or oils, and processed fats or oils obtained by subjecting the above fats or oils to one or more treatments selected from hydrogenation, fractionation and transesterification, and the time required to reach 50% of an equilibrium value is within 50 seconds in an increase in conductivity when 2 g of the composition is added to 200 g of deionized water at 35° C. and is stirred at 500 rpm with stirrer.

2. The water-in-oil type fat or oil composition for margarines according to claim 1, wherein the content of an oil phase in the water-in-oil type fat or oil composition is 61% by weight or more.

3. The water-in-oil type fat or oil composition for margarines according to claim 1, which contains a glycerin fatty acid ester.

4. The water-in-oil type fat or oil composition for margarines according to claim 1, which is produced using a continuous type cooling and kneading device comprising at least each one or more of a scraping type cooling unit (A unit) and a kneading unit (B unit), wherein
  (a) an average cooling rate in an initial A unit is 1.2° C./second or more and less than 2.5° C./second, and
  (b) an emulsion temperature of a final B unit outlet is at least 1.5° C. higher than an emulsion temperature of an outlet of the A unit immediately before the final B unit.

5. A method for producing a water-in-oil type fat or oil composition for margarines including margarine and fat spreads containing 0.4% by weight or more and less than 1.0% by weight of a salt, wherein the time required to reach 50% of an equilibrium value is within 50 seconds in an increase in conductivity when 2 g of the composition is added to 200 g of deionized water at 35° C. and is stirred at 500 rpm with stirrer, the method comprising cooling and kneading a raw material for a water-in-oil type fat or oil composition containing 0.4% by weight or more and less than 1.0% by weight of a salt, wherein the oil is at least one selected from a group consisting of vegetable and animal fats or oils and processed fats or oils obtained by subjecting the above fats or oils to one or more treatments selected from hydrogenation, fractionation and transesterification, using a continuous type cooling and kneading device comprising at least each one or more of a scraping type cooling unit (A unit) and a kneading unit (B unit), wherein
  (a) an average cooling rate in an initial A unit is 1.2° C./second or more and less than 2.5° C./second, and
  (b) an emulsion temperature of a final B unit outlet is at least 1.5° C. higher than an emulsion temperature of an outlet of the A unit immediately before the final B unit.

* * * * *